US011110679B2

(12) United States Patent
Onishi

(10) Patent No.: US 11,110,679 B2
(45) Date of Patent: Sep. 7, 2021

(54) METHOD FOR MANUFACTURING BELT-SHAPED CORD MEMBER

(71) Applicant: Sumitomo Rubber Industries, Ltd., Hyogo (JP)

(72) Inventor: Kei Onishi, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 323 days.

(21) Appl. No.: 16/265,788

(22) Filed: Feb. 1, 2019

(65) Prior Publication Data

US 2019/0240940 A1 Aug. 8, 2019

(30) Foreign Application Priority Data

Feb. 7, 2018 (JP) .............................. JP2018-019888

(51) Int. Cl.
*B29D 30/70* (2006.01)
*B60C 9/18* (2006.01)
(Continued)

(52) U.S. Cl.
CPC .............. *B29D 30/70* (2013.01); *B26D 1/105* (2013.01); *B26D 5/02* (2013.01); *B26D 5/08* (2013.01);
(Continued)

(58) Field of Classification Search
CPC ........ B29D 30/70; B29D 30/46; B29D 30/38; B29D 2030/466; B26D 1/105; B26D 5/32; B26D 5/02; B26D 5/08; B60C 9/1807
(Continued)

(56) References Cited

U.S. PATENT DOCUMENTS 3,349,359 A * 10/1967 Morey ................... H05B 3/342
338/208
4,538,054 A * 8/1985 de la Bretoniere ...... D02G 3/12
219/545
(Continued)

FOREIGN PATENT DOCUMENTS

CN 102644137 A * 8/2012
JP 03251440 A * 11/1991 ............. B29D 30/46
(Continued)

*Primary Examiner* — Michael N Orlando
*Assistant Examiner* — Abhishek A Patwardhan
(74) *Attorney, Agent, or Firm* — Studebaker & Brackett PC

(57) ABSTRACT

A method for manufacturing a belt-shaped cord member by cutting a rubber topped fabric produced by covering a topping rubber on an interdigitated fabric formed by interweaving many warp textile cords and few wefts to a predetermined width, comprising:
an interdigitated fabric forming step of arranging a cord having conductivity for every predetermined number of the many warp textile cords which is then interwoven with the weft yarn,
a rubber topped fabric producing step of topping rubber on the front and back surfaces of the interdigitated fabric, and
a cutting step of cutting the produced rubber topped fabric by every predetermined number of the textile cords,
wherein, in the cutting step,
the rubber topped fabric is cut along the textile cord in which a cord having conductivity is arranged, after the position of the textile cords is specified by energizing the rubber topped fabric.

7 Claims, 2 Drawing Sheets

(51) Int. Cl.
*B26D 1/10* (2006.01)
*B26D 5/32* (2006.01)
*B29D 30/46* (2006.01)
*B26D 5/02* (2006.01)
*B26D 5/08* (2006.01)
*B29D 30/38* (2006.01)

(52) U.S. Cl.
CPC ............... *B26D 5/32* (2013.01); *B29D 30/38* (2013.01); *B29D 30/46* (2013.01); *B60C 9/1807* (2013.01); *B29D 2030/466* (2013.01)

(58) Field of Classification Search
USPC .......................................................... 156/148
See application file for complete search history.

(56) References Cited

U.S. PATENT DOCUMENTS

| | | | | |
|---|---|---|---|---|
| 4,580,132 A | * | 4/1986 | Kato | G01V 3/02 250/359.1 |
| 4,860,620 A | * | 8/1989 | Pizzorno | B26D 3/003 83/156 |
| 6,932,120 B2 | * | 8/2005 | Busskamp | B26D 5/005 139/420 A |
| 2013/0199349 A1 | * | 8/2013 | Ravat | B26D 1/141 83/14 |

FOREIGN PATENT DOCUMENTS

| | | |
|---|---|---|
| JP | 2010-255141 A | 11/2010 |
| JP | 2011-001661 A | 1/2011 |
| JP | 2011-101992 A | 5/2011 |
| JP | 5369179 B2 | 12/2013 |
| JP | 5490495 B2 | 5/2014 |
| JP | 5503444 B2 | 5/2014 |
| JP | 5566983 B2 | 8/2014 |
| JP | 2016-049733 A | 4/2016 |
| JP | 5970032 B2 | 8/2016 |
| JP | 2017-043122 A | 3/2017 |
| JP | 6114187 B2 | 4/2017 |

\* cited by examiner

[Fig 1]
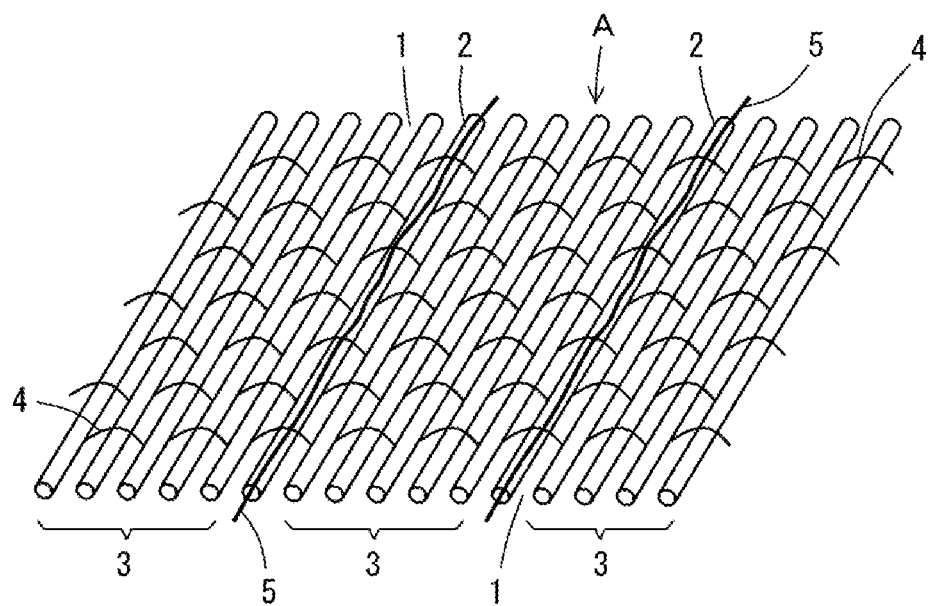
[Fig 2]
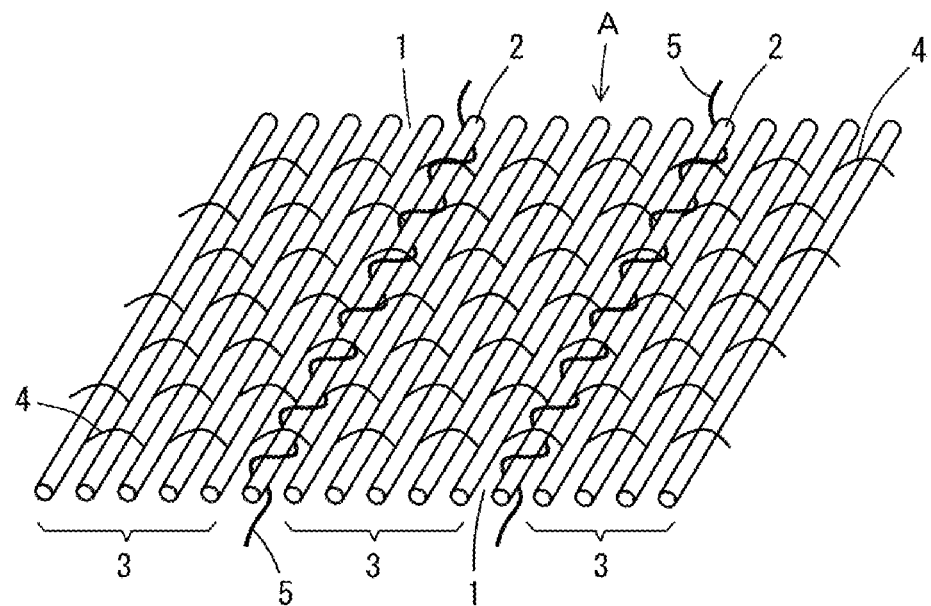

[Fig 3]
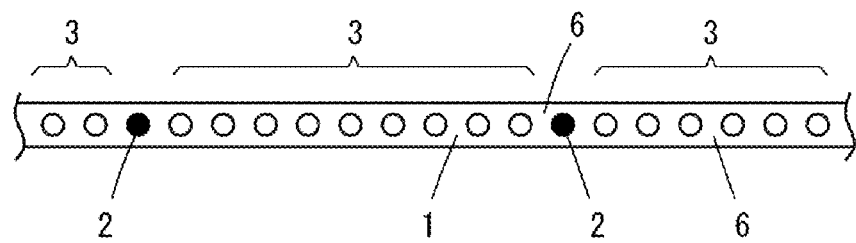
[Fig 4]
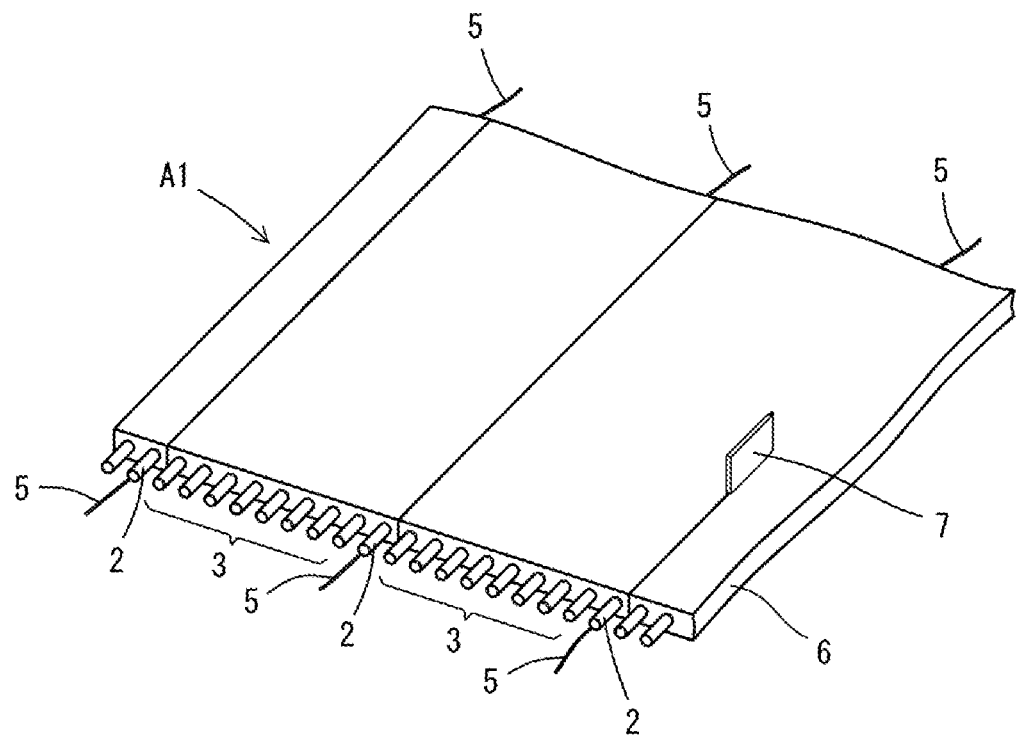

METHOD FOR MANUFACTURING BELT-SHAPED CORD MEMBER

TECHNICAL FIELD

The present invention relates to a method for manufacturing a belt-shaped cord member. More specifically, it relates to a method for manufacturing a belt-shaped cord member to which rubber is topped on both sides of a textile cord in which a predetermined number is arranged.

BACKGROUND ART

In a manufacturing process of tire, in order to improve durability and running stability of the tire, a belt-shaped cord member, such as a jointless band (JLB) are used to which rubber is topped on both sides of a textile cord in which a predetermined number (usually 3 to 20) is arranged.

Generally; such a belt-shaped cord member is manufactured by a method where a wide-width interdigitated fabric is produced by arranging 1000 to 2000 textile cords as warp yarns which are interwoven with a few weft yarns, and then rubber is topped on the front and back surfaces of the produced interdigitated fabric to make a rubber topped fabric, followed by cutting the rubber topped fabric for every predetermined number of textile cord.

At this time; if the number of textile cords arranged in the manufactured belt-shaped cord member is not uniform, the FV level in the manufactured tire may be deteriorated.

For this reason, conventionally on producing the interdigitated fabric, it has been proposed that one or two textile cords of different specifications are arranged as recognition codes for every predetermined number of arranged textile cords to produce a rubber topped fabric, and a cutting blade is set at a position of the textile cords of different specifications to cut the rubber topped fabric to obtain a belt-shaped code member having a predetermined number of textile cords. (For example, Patent Documents 1 to 3)

PRIOR ART DOCUMENTS

Patent Documents

Patent Document 1: JP5490495B
Patent Document 2: JP2011-1661A
Patent Document 3: JP2011-101992A

SUMMARY OF THE INVENTION

Problem to be Solved by the Invention

However, in the conventional method for manufacturing a belt-shaped cord member as described above, since confirmation of the cutting position and setting of the cutting blade are carried out by visual observation by a worker, occurrence of a confirmation error or a set mistake cannot be avoided which causes problems in producing a tire with stable quality.

It is therefore an object of the present invention to provide a method for manufacturing a belt-shaped cord member which can produce a tire with stable quality by accurately performing a cutting position confirmation and a cutting blade setting without visual observation by a worker.

Means for Solving the Problem

The inventor of the present invention has conducted intensive studies oil solving the above-mentioned problems, found that the above-mentioned problems can be solved by the inventions described below, and have completed the present invention.

The invention according to claim 1 is;
a method for manufacturing a belt-shaped cord member by cutting a rubber topped fabric produced by covering a topping rubber on an interdigitated fabric formed by interweaving many warp textile cords and few wefts to a predetermined width, comprising;
an interdigitated fabric forming step of arranging a cord having conductivity for every predetermined number of the many warp textile cords which is then interwoven with the weft yarn to form an interdigitated fabric,
a rubber topped fabric producing step of topping rubber on the front and back surfaces of the interdigitated fabric to produce the rubber topped fabric, and
a cutting step of cutting the produced rubber topped fabric by every predetermined number of the textile cords,
wherein, in the cutting step,
the rubber topped fabric is cut along the textile cord in which a cord having conductivity is arranged, after the position of the textile cord is specified by energizing the rubber topped fabric.

The invention of claim 2 is;
the method for manufacturing a belt-shaped cord member according to claim 1, wherein, in the interdigitated fabric forming step, the arrangement of the cord having conductivity is performed by inserting the cord along with the textile cord.

The invention of claim 3 is;
the method for manufacturing a belt-shaped cord member according to claim 2, wherein insertion of the cord having conductivity to be performed along with the textile cord is performed linearly along the side face of the textile cord.

The invention of claim 4 is;
the method for manufacturing a belt-shaped cord member according to claim 2, wherein insertion of the cord having conductivity to be performed along with the textile cord is performed by winding the cord in a spiral form on the side surface of the textile cord.

The invention of claim 5 is;
the method for manufacturing a belt-shaped cord member according to any one of claims 1 to 4, wherein thickness of the cord having conductivity is 120 to 240 dtex.

The invention of claim 6 is;
the method for manufacturing a belt-shaped cord member according to any one of claims 1 to 5, wherein, in the cutting step, a sensor is caused to scan in the width direction of the surface of the rubber topped fabric while energizing the cord having conductivity, and the position of the cord having conductivity is specified based on change in the electric or magnetic field detected by the sensor.

The invention of claim 7 is;
the method for manufacturing a belt-shaped cord member according to any one of claims 1 to 6, wherein the belt-shaped cord member is a jointless band.

Effect of the Invention

According to the present invention, it is possible to provide a method for manufacturing a belt-shaped cord member capable of producing a tire with stable quality by accurately performing the cutting position confirmation and the cutting blade setting without visual observation by a worker in manufacturing a belt-shaped cord member.

BRIEF DESCRIPTION OF DRAWINGS

FIG. 1 is a perspective view schematically showing an example of an interdigitated fabric used in an embodiment of the present invention.

FIG. 2 is a perspective view schematically showing another example of an interdigitated fabric used in an embodiment of the present invention.

FIG. 3 is a cross-sectional view illustrating an arrangement of textile cords in a rubber topped fabric produced using the interdigitated fabric shown in FIG. 1.

FIG. 4 is a perspective view schematically showing a manner of cutting a rubber topped fabric in an embodiment of the present invention.

EMBODIMENTS FOR CARRYING OUT THE INVENTION

Hereinafter, the present invention will be specifically described based on embodiments for carrying out the invention with reference to drawings.

Same as the conventional method for manufacturing a belt-shaped cord member, the method for manufacturing a belt-shaped cord member according to the present embodiment has an interdigitated fabric forming step for producing an interdigitated fabric in which a textile cord serving as a recognition code is arranged for every predetermined number of the many warp textile cords, a rubber topped fabric producing step of topping rubber on the front and back surfaces of the produced interdigitated fabric to produce the rubber topped fabric, and a cutting step of cutting the produced rubber topped fabric for every predetermined number of the textile cords based on the recognition code.

However, different from the conventional method for manufacturing a belt-shaped cord member, in the method for manufacturing a belt-shaped code member according to the present embodiment, instead of a textile code having different specification as the recognition code, a code having conductivity is arranged in the textile code to form a textile code to be the recognition code, and the textile code arranging a cord having conductivity is specified by energizing the produced rubber topped fabric and cut the rubber topped fabric.

Hereinafter, the manufacturing method for belt-shaped cord member according to the present embodiment will be described in the order of steps.

1. Interdigitated Fabric Forming Step

At first, an interdigitated fabric is produced in which many warp textile cords and few wefts are interwoven.

FIG. 1 is a perspective view schematically showing an example of an interdigitated fabric to be used in the present embodiment. For every predetermined number of textile cord, a cord having conductivity is inserted linearly along the side surface of the textile cords to form a textile code to be a recognition code.

FIG. 2 is a perspective view schematically showing another example of the interdigitated fabric to be used in the present embodiment. For every predetermined number of textile cord, a cord having conductivity is inserted by spirally winding the cord on the side surface of the textile code to form a textile code to be a recognition code.

In FIGS. 1 and 2, A is the interdigitated fabric, 1 is the array interval of the textile code, 2 is the textile code to which a code having conductivity is inserted, 3 is the textile code to which a code having conductivity is not inserted, 4 is a weft thread, and 5 is a cord having conductivity.

As shown in FIGS. 1 and 2, in the present embodiment as well as in the conventional case, large number of textile cords 2, 3 arranged parallel to each other at equal array intervals 1 are used as warp yarns, and interwoven with a small number of weft yarns 4 to produce the interdigitated fabric A.

However, in the present embodiment, as shown in FIGS. 1 and 2, a cord having conductivity 5 is arranged in every predetermined number of many warp textile cords to produce the interdigital fabric A.

When such an interdigitated fabric A is energized, the textile cord 2 on which the cord 5 having conductivity is arranged forms an electric field and a magnetic field different from those formed by the textile cord 3 on which cord 5 having conductivity is not arranged. Hence, the textile code 2 on which the code 5 having conductivity is arranged can be used as a recognition code, Specifically, by detecting the change of the electric and magnetic fields with a sensor while energizing the rubber topped fabric after topping rubber, the position of the textile code on which the cord having conductivity is arranged can be accurately specified. As a result, confirmation of the cutting position and setting of the cutting blade can be performed with high accuracy without visual observation by a worker, and a tire with stable quality can be produced.

In the present embodiment, examples of the cord having conductivity include metal wires, conductive fibers and the like. Specific examples of the conductive fibers include metal fibers such as stainless fibers, copper fibers, nickel fibers, aluminum fibers and the like, and non-metallic fibers, such as natural fibers, organic synthetic fibers, inorganic fibers and the like, surfaces of which are coated with metal. More specifically "Tenabel" manufactured by Teijin Ltd. (Registered trademark) or the like can be cited as an example thereof.

The thickness of such a cord having conductivity is preferably 120 to 240 dtex. Since such a thickness is much thinner than the thickness of the textile cord of 800 to 2100 dtex, there is no fear of inhibiting the function as a belt-shaped cord member even when it is arranged along with the textile cord.

As the material of the textile cord, those which have been used for a textile cord conventionally can be appropriately selected and used, and include synthetic fibers such as polyamide fiber, aromatic polyamide fiber, PEN (polyethylene naphthalate), PET (polyester fiber), and pulp fiber such as rayon, as in the prior art. As described above, the thickness is appropriately determined from the range of 800 to 2100 dtex. The total number is appropriately determined from the range of 1000 to 2000, and is arranged at an array density which is appropriately determined from the range of 25 to 75/50 mm.

Further, the weft 4 is appropriately selected and used according to the material of the textile cord. As the example, polyethylene fiber and the like can be mentioned.

2. Rubber Topped Fabric Producing Step

Next, according to the following procedure, rubber is topped on both front and back surfaces of the interdigitated fabric to produce a rubber topped fabric. The rubber topped fabric producing step is basically the same as a conventional rubber topped fabric producing step.

Specifically, at first, a dipping treatment is applied to the interdigitated fabric in order to improve the adhesiveness between the rubber and the textile cord.

Next, top and bottom surfaces of the dip treated interdigitated fabric are covered with topping rubber to produce a rubber topped fabric.

FIG. 3 is a cross-sectional view for explaining the arrangement of textile cords in the rubber topped fabric produced by using the interdigital fabric shown in FIGS. 1, and 6 is a topping rubber. As shown in FIG. 3, in the rubber topped fabric, a textile cord 2 arranging a cord having conductivity is disposed for every predetermined number of textile cord, and both surfaces are covered with topping rubber 6.

3. Cutting Step

Next, according to the following procedure, the rubber topped fabric is cut for every predetermined number of textile cord, (1) Identifying the Position of a Cord Having Conductivity Prior to the cutting, the position of the cord having conductivity to be the cutting position is specified.

Specifically, as described above, the textile cord 2 on which the cord 5 having conductivity is arranged forms an electric field and a magnetic field different from those formed by the textile cord 3 on which no cord 5 having conductivity is arranged, at the time of energization. Hence, it is possible to specify the position of the textile code on which the code having conductivity is arranged by energizing while scanning a sensor, such as an electric field sensor capable of detecting a change in an electric field and a magnetic field sensor capable of detecting a change in a magnetic field, in the width direction of the surface of the rubber topped fabric.

In this way, in the present embodiment, the position of the code having conductivity is specified by detecting the change of the electric field or the magnetic field and the textile code arranging a code having conductivity is specified as the recognition code, unlike the conventional case where the textile code to be recognition code is specified by visual observation. Hence, occurrence of a mis-confirmation of the cutting position does not occur.

(2) Setting Cutting Blade and Cutting

Next, the cutting blade is set based on the position of the textile cord where the code having specified conductivity is arranged, and the cutting blade is moved along the textile cord to cut the rubber topped fabric.

FIG. 4 is a perspective view schematically showing how to cut the rubber topped fabric in this embodiment. As shown in FIG. 4, the rubber topped fabric A1 can be cut to a predetermined width by moving the cutting blade 7 along the textile cord 2 on which the cord 5 having conductivity is arranged. At this time, since the cutting blade 7 is set at the cutting position specified earlier, it is possible to produce a belt-shaped cord member by cutting with high precision without causing a set mistake.

When manufacturing a tire using such a belt-shaped cord member, for example, a jointless band (JLB), since the number of textile cords in the belt-shaped cord member is maintained with high accuracy, the FV level in the produced tire is improved, and tires with stable quality can be produced.

EXAMPLE

Hereinafter, the present invention will be described in more detail based on examples.

1. Examples and Comparative Examples

(1) Example

In the present example, a rubber topped fabric (thickness 0.70 mm) was prepared by covering topping rubber on both sides of an interdigital fabric produced by adding a cord manufactured by Teijin Limited (thickness 300 dtex) having conductivity to a warp made of 1,400 pieces of 66 nylon (thickness 1400 dtex/2) for every 10 pieces of the nylon.

Next, using an electric field sensor, scanning the surface of the rubber topped fabric in the width direction was performed with the sensor while energizing to detect the change of the electric field, thereby specifying the textile code arranging a cord having conductivity. Then, a cutting blade was set at that position followed by cutting to produce 140 jointless bands.

(2) Comparative Example

According to the same manner as in Example except that the position of the textile cord arranging a cord having conductivity was visually specified and a cutting blade was set at that position followed by cutting, 140 jointless bands were produced.

2. Evaluation

For each of the jointless bands obtained in Example and Comparative example, the number of textile cords arranged in the jointless band was confirmed and the extent of the variation was evaluated.

As a result of evaluation, in Example, ten textile codes were arranged in all jointless bands. In contrast, in Comparative example, ten textile cords were not arranged in 15 of the 140 jointless bands, and variations occurred.

Although the present invention has been described based on the embodiments, the present invention is not limited to the above-described embodiments. Various modifications can be made to the above embodiment within the same and equivalent scope as the present invention.

DESCRIPTION OF THE REFERENCE SIGNS

1 Array interval (in Textile code)
2 Textile code on which cord having conductivity is arranged
3 Textile cord on which no cord having conductivity is arranged
4 Weft
5 Cord having conductivity
6 Topping rubber
7 Cutting blade
A Interdigitated fabric
A1 Rubber topped fabric

What is claimed is:

1. A method for manufacturing a belt-shaped cord member by cutting a rubber topped fabric produced by covering a topping rubber on an interdigitated fabric formed by interweaving non-conductive warp textile cords and non-conductive wefts to a predetermined width, comprising;

an interdigitated fabric forming step of arranging a cord having conductivity for every predetermined number of the non-conductive warp textile cords which is then interwoven with the non-conductive wefts to form an interdigitated fabric wherein all the wefts are non-conductive, a rubber topped fabric producing step of topping rubber on the front and back surfaces of the interdigitated fabric to produce the rubber topped fabric, and a cutting step of cutting the produced rubber topped fabric by every predetermined number of the textile cords, wherein in the cutting step, the rubber topped fabric is cut along the textile cord in which a cord having conductivity is arranged, after the position of the textile cords is specified by energizing the rubber topped fabric.

2. The method for manufacturing a belt-shaped cord member to according to claim 1, wherein, in the interdigitated fabric, forming step, the arrangement of the cord having conductivity is performed by inserting the cord along with the textile cord.

3. The method for manufacturing a belt-shaped cord member according to claim 2, wherein insertion of the cord having conductivity to be performed along with the textile cord is performed linearly along the side face of the textile cord.

4. The method for manufacturing a belt-shaped cord member according to claim 2, wherein insertion of the cord having conductivity to be performed along with the textile cord is performed by winding the cord in a spiral form on the side surface of the textile cord.

5. The method for manufacturing a belt-shaped cord member according to claim 1, wherein thickness of the cord having conductivity is 120 to 240 dtex.

6. The method for manufacturing a belt-shaped cord member according to claim 1, wherein, in the cutting step, a sensor is caused to scan in the width direction of the surface of the rubber topped fabric while energizing the cord having conductivity, and the position of the cord having conductivity is specified based on change in the electric or magnetic field detected by the sensor.

7. The method for manufacturing a belt-shaped cord member according to claim 1, wherein the belt-shaped cord member is a jointless band.

* * * * *